(12) United States Patent
Schneider

(10) Patent No.: US 6,384,902 B1
(45) Date of Patent: May 7, 2002

(54) SURVEYING APPARATUS COMPRISING A HEIGHT MEASURING DEVICE

(75) Inventor: Klaus Schneider, Hohenems (AT)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 09/492,163

(22) Filed: Jan. 27, 2000

(30) Foreign Application Priority Data

Jan. 27, 1999 (EP) ................................................ 9910443

(51) Int. Cl.[7] .............................. G01C 1/00; G01C 3/00; G01C 3/08
(52) U.S. Cl. ........................ 356/3.01; 33/284; 356/4.08
(58) Field of Search ............................ 33/284; 356/4.08, 356/3.01–3.08, 5.01–5.15

(56) References Cited

FOREIGN PATENT DOCUMENTS

| DE | 31 22 483 A1 | 3/1982 |
|---|---|---|
| DE | 198 02 379 A1 | 7/1998 |
| DE | 0 856 718 A2 | 8/1998 |

*Primary Examiner*—Stephen C. Buczinski
(74) *Attorney, Agent, or Firm*—Rothwell, Figg, Ernst & Manbeck p.c.

(57) ABSTRACT

To determine the height of a surveying apparatus (1) above a point (15) on the ground, the surveying apparatus (1) has a distance measuring device and is provided with a front attachment (11) which is mounted on the telescope (8) and effects beam deflection and simultaneous beam divergence of an emitted infrared or laser beam towards the point (15) on the ground. The light beam is deflected around the surveying apparatus (1) and a stand (2) carrying the apparatus. Exact sighting of the point (15) on the ground is no longer necessary. The height is calculated as a function of the distance between the point on the ground and the rotary position of the telescope (8), which distance is in any case relatively accurately measurable in the apparatus.

8 Claims, 2 Drawing Sheets

SURVEYING APPARATUS COMPRISING A HEIGHT MEASURING DEVICE

BACKGROUND OF THE INVENTION

1. Field of the Invention

The invention relates to a surveying apparatus comprising a device for determining the height above a point on the ground, according to the preamble of patent claim 1.

2. Description of the Related Art

For geodetic surveying, it is necessary to know sufficiently accurately the height of the surveying apparatus above a reference point on the ground. In the case of a surveying apparatus described in DE 198 02 379 A1, an infrared distance measuring device also suitable for horizontal distance measurements is used for measuring the height of the apparatus above the ground. For this purpose, the telescope is equipped with a front attachment which deflects the emitted light beam around the index arm and the head of the stand carrying the surveying apparatus and directs said light beam at the point on the ground. The front attachment contains a plane mirror with adjustable inclination. A measuring processor determines the height of the horizontal axis of the telescope above the point on the ground from the measured length of the distance from the horizontal axis via the plane mirror to the point on the ground and the angle which the plane mirror makes with the optical axis of telescope. In another version of the surveying apparatus, the height of the horizontal axis above the point on the ground is determined from the angle which the optical axis of the telescope makes with the horizontal and the angle which the plane mirror makes with the optical axis of the telescope.

The determination of the angle between plane mirror and optical axis of the telescope is relatively inaccurate. However, small errors in measurement have a considerable effect on the accuracy of the calculated height. The use of the apparatus for precise surveying tasks is therefore problematic. Moreover, the angle measurement at the plane mirror is carried out manually. The angle value must therefore be communicated to the measuring processor by input on a keyboard.

SUMMARY OF THE INVENTION

It is the object of the invention to improve a measuring apparatus of the type stated at the outset in such a way that the height determination can be effected more accurately.

According to the invention, this object is achieved by a surveying apparatus according to the features of patent claim 1.

Instead of a plane mirror, as in the surveying apparatus according to the prior art, a reflector which simultaneously effects beam divergence is used for beam deflection in a surveying apparatus according to the invention. The divergence angle of the divergence beam is adjusted so that the point on the ground is always illuminated for the heights possible during operation. A reflector arranged at the point on the ground enables the distance measuring device in the apparatus to measure the distance of the point on the ground from the axis of rotation or horizontal axis of the telescope via the beam deflection.

Expediently, the position of the telescope can be variable and is determined for the height determination. The angle of tilt of the telescope is available through an angle-of-tilt encoder which is in any case present. A processor-assisted evaluation device uses trigonometric relationships to calculate therefrom the height of the horizontal axis of the telescope above the reflector arranged at the point on the ground.

Distance and angle measurement are performed with the usual high accuracy of measurement of the apparatus, so that the height above the point on the ground can be sufficiently accurately determined. Since distance and angle measurement have been carried out to date under processor control, the height measurement can be automated by simple software modification.

For beam deflection and simultaneous beam divergence, a convex mirror or a prism having a curved reflecting surface or an appropriate combination of mirror, lens and/or prism is suitable. Preferably, the infrared or laser beam emitted by the telescope is caused to diverge in a vertical plane, i.e. the plane perpendicular to the horizontal axis. The mirror or the mirror/lens/prism combination causes the emitted light beam to diverge to such an extent that, with an approximately horizontal position of the telescope, the light striking the ground illuminates the point on the ground at the customary working heights, for example between 1.00 m and 2.20 m. Exact sighting of the point on the ground is not necessary. With a beam divergence in the horizontal direction too, the points on the ground which are slightly outside the plumb line under the apparatus can also be used for the height measurement.

Particularly in the case of motor-powered apparatuses, the control of the apparatus can be programmed so that the height measurement takes place fully automatically. Manual height input is no longer necessary.

The invention is explained in detail below with reference to the embodiment shown in the drawing. Corresponding elements are provided with the same reference symbols.

DETAILED DESCRIPTION OF THE PREFERRED EMBODIMENTS

Figure 1:
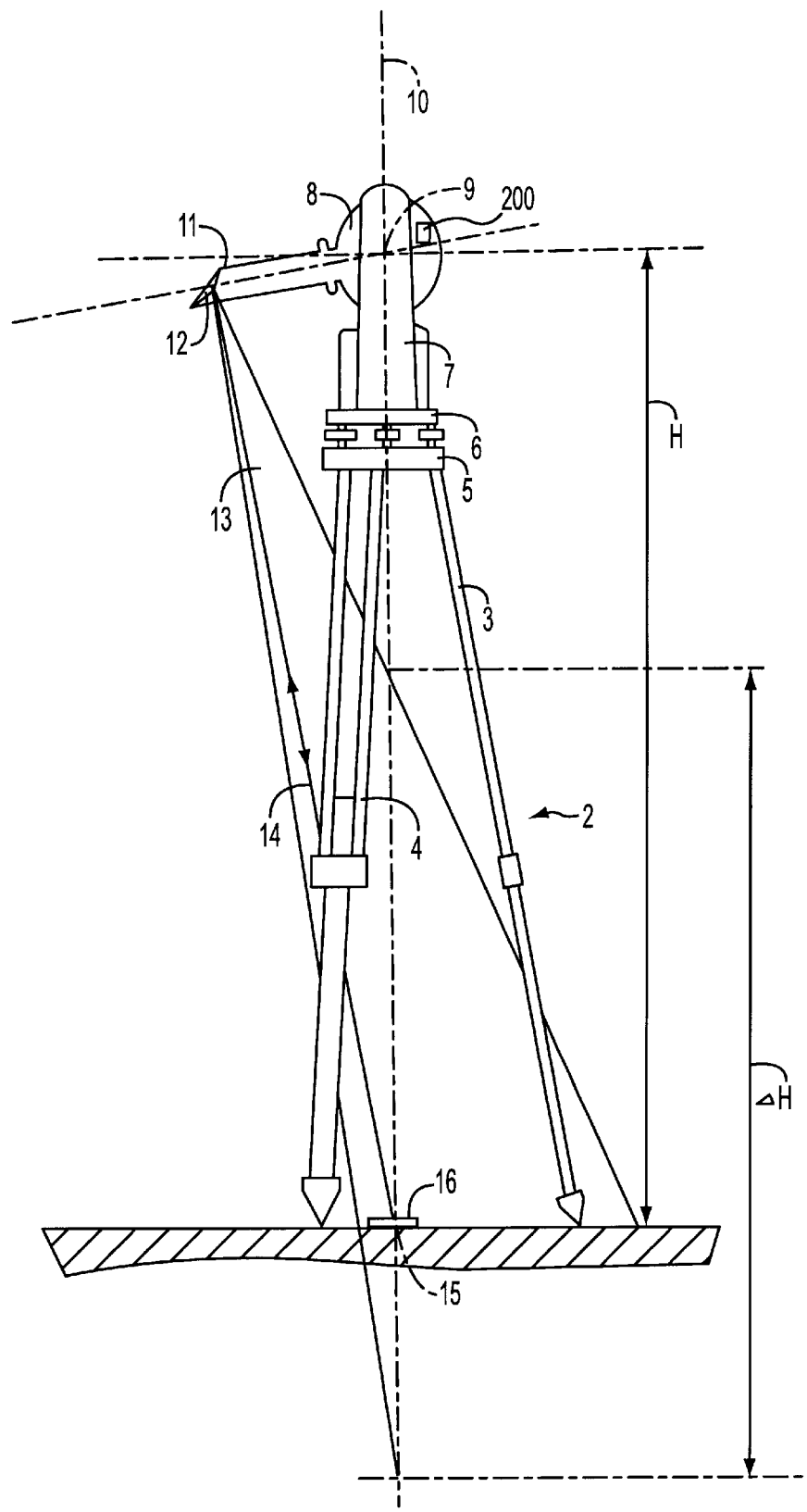
FIG. 1 shows a theodolite mounted on a stand, during a height measurement.

In FIG. 1, the stand 2 carrying a theodolite is a conventional tripod stand, of which the legs 3 and 4 are shown. The stand legs are rotatably fastened to a stand head 5. A tripod 6 mounted on the stand head is aligned horizontally and carries the theodolite 1. The stand legs can be swivelled out and are adjustable in length in order to position the theodolite at a desired height. The theodolite 1 comprises an index arm 7 which is rotatable on the tripod 6 about a vertical axis 10 and in which a telescope 8 rotatable about a horizontal axis 9 is arranged. The telescope 8 contains a light transmitter for measuring vertical and horizontal angles by sighting a point in space. The light transmitter operates on the basis of infrared or laser light. Also provided is a light receiver which receives the infrared or laser light emitted by the telescope and returned by a reflector. Using modulation or phase measurement techniques, the distance of the reflector is determined by comparing emitted and received light beams. Distances of measuring points in the terrain are thus measured.

The surveying tasks are carried out relative to a point 15 on the ground, through which the vertical axis 10 of the theodolite 1 passes. For ground surveying, a sufficiently accurate knowledge of the height H of the horizontal axis 9 of the telescope 8 above the point 15 on the ground is required. To determine this, the distance measuring device contained in the telescope 8 is also used. A device for beam deflection 12 deflects the light beam emitted by the infrared or laser light transmitter of the telescope 8 under the stand 2 towards the point 15 on the ground. The beam deflector 12 is arranged on the outer end of a front attachment 11 which is mounted on that end of the telescope 8 from which light emerges. The length of the front attachment 11 is adjusted so that the beam deflector is sufficiently far away from the horizontal axis 9 for light deflecting downwards to travel unhindered past the index arm 7 and the stand head 5 to the point 15 on the ground under the stand 2.

The device for beam deflection 12 causes divergence of the light beam emitted by the telescope 8. The light beam strikes the beam deflector 12 virtually at a point and is caused to diverge, at least within the vertical plane which is perpendicular to the horizontal axis 9 and passes through the vertical axis 10, to give a light area 13. A reflector 16 arranged at the point 15 on the ground scatters the light arriving along the beam 14. A back-scattered fraction passes along the beam 14 and via the beam reflector 12 back into the telescope 8. There, a distance measurement is carried out, which gives the length of the distance from the horizontal axis 9 to the point of incidence on the beam deflector 12 and along the beam 14 to the reflector 16.

Suitable devices for beam deflection 12 are conventional known means, for example a convex mirror or prism having a convex reflecting side or an appropriate combination of lens and mirror and/or prism. The divergence angle of the divergence of the light beam via the beam deflector 12 is adjusted so that, with an approximately horizontal alignment of the telescope 8 and when the axis of the emitted infrared or laser light approximately coincides with the horizontal plane passing through the horizontal axis 9, the point 15 on the ground or the reflector 16 is inside the light area 13 for all heights H to be inspected during operation of the theodolite and is illuminated by the light. The difference, permissible at the inclination of the telescope 8 relative to the, horizontal, shown in FIG. 1, between minimum and maximum height of the horizontal axis 9 of the theodolite 1 above the point 15 on the ground is denoted by $\Delta H$. In practice, the divergent beam 13 has a divergence angle such that, with virtually horizontal position of the telescope 8, a point 15 on the ground is detected in the vertical axis 10, at heights H in the range from 1.0 m to 2.2 m.

The beam divergence effected by the beam deflector 12 may additionally take place in a direction parallel to the horizontal axis 9, i.e. horizontally. As a result of this, points 15 on the ground slightly outside the vertical axis of the theodolite can also be used for the height measurement. The rotary position of the telescope relative to the vertical axis 10 is chosen so that the light passes as far as possible in the middle between two stand legs. Expediently, the beam divergence is effected in such a way that the area under the stand is illuminated by the light cone between the stand legs placed on the ground.

Conventional retroreflectors, for example reflecting foils or reflecting prisms, can be used as reflector 16. What is important is that the reflectivity of the reflector 16 is greater than the reflectivity of the environment by an amount such that infrared or laser light reflected by the surrounding objects does not falsify the measurement.

Figure 2:
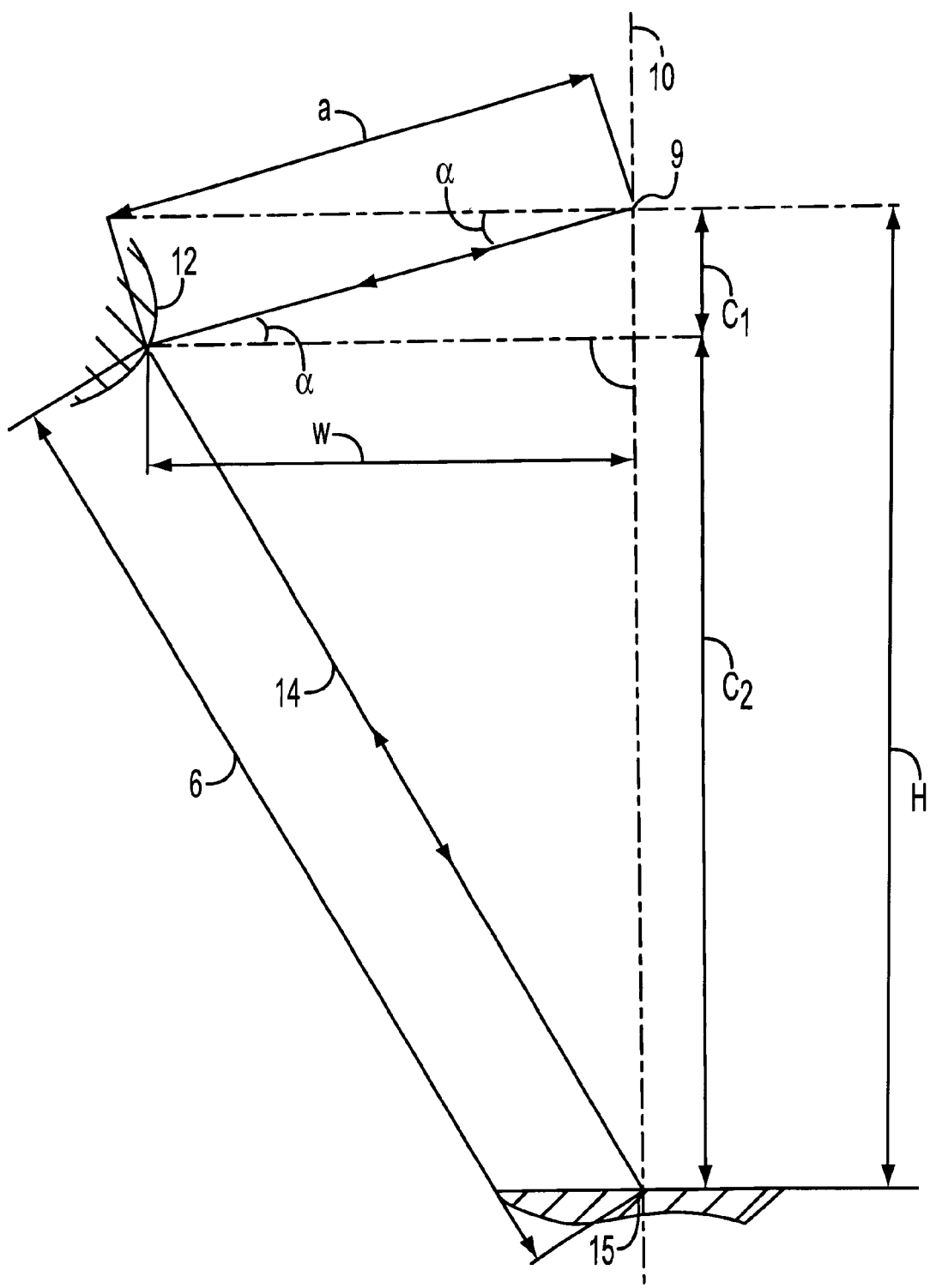
FIG. 2 shows an equivalent geometric diagram of relevant distances and angles in the apparatus of FIG. 1.

The following geometric relationship shown in FIG. 2 applies to the height of the theodolite 1, i.e. the height H of the horizontal axis 9, above the point 15 on the ground:

$$H = c_1 + c_2$$

$$c_1 = a \cdot \sin \alpha$$

$$c_2 = \sqrt{b^2 - w^2}, \text{ where } b = L - a \text{ and } w = a \cdot \cos \alpha$$

The length of the distance a is specified constructionally as the distance of the reflector for the beam deflector 12 from the horizontal axis 9. The angle $\alpha$ is the angle which is made by the optical axis of the light emitted by the telescope and the horizontal. The distance L is the length, measured by the distance measuring device, of the distance from the horizontal axis 9 via the beam deflector 12 to the point 15 on the ground or the reflector 16 arranged there. Thus, the following is true for the height H of the theodolite above the point on the ground:

$$H = a \cdot \sin \alpha + \sqrt{(L-a)^2 - (a \cdot \cos \alpha)^2}$$

The determination of the height H requires only the measurement of the angle $\alpha$ and of the distance L of the point 15 on the ground from the horizontal axis 9 via the beam deflector reflector 12. The distance L is measured by the distance measuring device contained in the telescope. The angle a is determined by the angle encoder. The angle encoder operates, for example, according to an incremental, dynamic or statically encoded method and gives a result sufficiently exact for the required accuracy for the height measurement. Both distance measurement and angle measurement are among the conventional functions of the theodolite. The accuracy of the measurements is therefore relatively high. If the telescope is held in a predetermined position during the distance measurement, for example horizontally with $\alpha = 0$, the above formula and the calculation are simplified.

The theodolite 1 is controlled by a microprocessor 200. After an operator has mounted and locked the front attachment on the telescope 8 and has brought the telescope into an approximately horizontal position, the height measurement is activated by input by an operator, for example on the keyboard. The control of the apparatus determines the angle $\alpha$ by means of the corresponding angle encoder and the length L by means of the distance measurement in the telescope 8. The data are processed in a microprocessor 200 using the above formula or a sufficiently accurately approximation derived therefrom. The height H is then available to the apparatus for the ground surveying tasks.

The operator must ensure that the divergent light beam strikes the reflector 16 at the point 15 on the ground. The operator guidance on the instrument is expediently designed to indicate the value range within which the height H can be measured, depending on the tilt of the telescope 8 relative to the horizontal. In addition or alternatively, it is possible to indicate whether a light beam reflected by the reflector 16 is received in the telescope 8.

If the theodolite has a servo motor for rotating the telescope 8 about the axis 9, the height measurement can be performed fully automatically by the apparatus. If the telescope 8 is deflected from the horizontal to such an extent that the reflector 16 at the point 15 on the ground is not within the divergent light beam 13, the telescope 8 is adjusted until a beam reflected by the reflector 16 is detected, in order to carry out the measurement.

What is claimed is:

1. A surveying apparatus comprising a reflector, a theodolite and a height determination device for determining the vertical distance between a reference point on the ground and the theodolite positioned vertically above the reference point, the reflector is arranged at the reference point having a greater reflectivity in an upward direction than the environment of the reflector, the theodolite comprising:

a telescope, rotatable about a horizontal axis of the theodolite by a tilt angle;

a distance measuring device attached to the telescope for measuring the distance between the telescope and the reflector by emitting a light beam in a direction corresponding to the tilt angle and by receiving light reflected by the reflector; and an angle-of-tilt encoder for measuring the tilt angle;

the height determination device comprising:

optical means for deflecting the emitted light beam in a downward direction towards the reflector and for expanding the divergence of the light beam at least in a direction perpendicular to the horizontal axis; and a front attachment for removably positioning the optical means at a predetermined distance in front of the telescope;

the theodolite further comprising a processor-assisted evaluation device attached to the angle-of-tilt-encoder and the distance measuring device for determining the vertical distance.

2. A surveying apparatus according to claim 1, wherein the optical means is additionally expanding the divergence of the emitted light beam in a direction parallel to the horizontal axis.

3. A surveying apparatus according to claim 1, wherein the vertical distance is calculated at least approximately by the evaluation device according to the relationship $$H = a \cdot \sin \alpha + \sqrt{(L-a)^2 - (a \cdot \cos \alpha)^2}$$

H being the vertical distance, a being the distance of the optical means from the horizontal axis, L being the distance measured by the distance measurement device and a being the angle measured by the angle-of-tilt-encoder.

4. A surveying apparatus according to claim 1, which is arranged on a height-adjustable stand and wherein the optical means for deflecting the emitted beam produces a divergent light beam which illuminates the reference point, wherever the position of the telescope is essentially horizontal and the stand is adjusted to the minimum or maximum height position.

5. A surveying apparatus according to claim 1, wherein the optical means is selected from the group consisting of:

a curved mirror, a prism having a curved area of the surface, or a combination of a lens and a mirror.

6. A surveying apparatus according to claim 2, wherein the optical means is selected from the group consisting of:

a curved mirror, a prism having a curved area of the surface, or a combination of a lens and a mirror.

7. A surveying apparatus according to claim 3, wherein the optical means is selected from the group consisting of:

a curved mirror, a prism having a curved area of the surface, or a combination of a lens and a mirror.

8. A surveying apparatus according to claim 4, wherein the optical means is selected from the group consisting of:

a curved mirror, a prism having a curved area of the surface, or a combination of a lens and a mirror.

* * * * *